(12) United States Patent
Murakami et al.

(10) Patent No.: US 11,739,684 B2
(45) Date of Patent: Aug. 29, 2023

(54) ENGINE

(71) Applicant: Yanmar Power Technology Co., Ltd., Osaka (JP)

(72) Inventors: Taishi Murakami, Osaka (JP); Masayoshi Doui, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

(21) Appl. No.: 17/961,246

(22) Filed: Oct. 6, 2022

(65) Prior Publication Data
US 2023/0033387 A1    Feb. 2, 2023

Related U.S. Application Data

(63) Continuation of application No. 17/364,869, filed on Jun. 30, 2021, now Pat. No. 11,492,960, which is a (Continued)

(30) Foreign Application Priority Data

Jul. 12, 2016  (JP) .................................. 2016-137650

(51) Int. Cl.
| | |
|---|---|
| F02B 43/02 | (2006.01) |
| F02B 37/18 | (2006.01) |
| F02B 37/16 | (2006.01) |
| F02D 41/00 | (2006.01) |
| F02D 19/02 | (2006.01) |

(Continued)

(52) U.S. Cl.
CPC .............. *F02B 43/02* (2013.01); *F02B 37/18* (2013.01); *F02B 43/04* (2013.01); *F02D 19/02* (2013.01); *F02D 19/06* (2013.01); *F02D 41/0007* (2013.01); *F02B 33/22* (2013.01); *F02B 37/16* (2013.01); *F02B 37/183* (2013.01);
(Continued)

(58) Field of Classification Search
CPC .......... F02B 43/02; F02B 37/18; F02B 43/04; F02B 33/22; F02B 37/16; F02B 37/183; F02B 39/16; F02D 19/02; F02D 19/06; F02D 41/0007; F02D 2250/34
See application file for complete search history.

(56) References Cited

U.S. PATENT DOCUMENTS 10,738,687 B2 *  8/2020  Murakami ..........  G01M 15/042
11,066,984 B2 *  7/2021  Murakami .............. F02D 23/00
(Continued)

FOREIGN PATENT DOCUMENTS

JP        2015178809 A   * 10/2015

*Primary Examiner* — Jacob M Amick
(74) *Attorney, Agent, or Firm* — Chris Mizumoto

(57) ABSTRACT

An engine including an exhaust bypass valve and an intake bypass valve. The exhaust bypass valve is disposed in an exhaust bypass channel connecting an outlet of an exhaust manifold and an exhaust outlet of a turbocharger to each other. The intake bypass valve is disposed in an intake bypass channel connecting an inlet of an intake manifold and an inlet of the turbocharger. An intake pressure sensor detects a pressure of the intake manifold. If an instruction value indicating an upper limit or a lower limit of the valve opening degree of the intake bypass valve is continuously output for a predetermined time or more, an engine control device determines that an abnormality occurs in at least one of the exhaust bypass valve and the intake bypass valve.

2 Claims, 8 Drawing Sheets

Related U.S. Application Data continuation of application No. 16/907,563, filed on Jun. 22, 2020, now Pat. No. 11,066,984, which is a continuation-in-part of application No. 16/315,984, filed as application No. PCT/JP2017/023224 on Jun. 23, 2017, now Pat. No. 10,738,687.

(51) Int. Cl.
  *F02D 19/06*  (2006.01)
  *F02B 43/04*  (2006.01)
  F02B 33/22  (2006.01)
  F02B 39/16  (2006.01)

(52) U.S. Cl.
  CPC .......... *F02B 39/16* (2013.01); *F02D 2250/34* (2013.01); *Y02T 10/12* (2013.01); *Y02T 10/30* (2013.01)

(56) References Cited

U.S. PATENT DOCUMENTS

| | | | |
|---|---|---|---|
| 11,492,960 B2* | 11/2022 | Murakami | F02D 19/105 |
| 2015/0308358 A1* | 10/2015 | Matsumoto | F02B 37/162 |
| | | | 60/602 |
| 2016/0169089 A1* | 6/2016 | Xiao | F02D 41/221 |
| | | | 415/1 |

* cited by examiner

ENGINE

CROSS-REFERENCE

This is a continuation of U.S. application Ser. No. 17/364,869 filed on Jun. 30, 2021, which is a continuation of U.S. application Ser. No. 16/907,563 filed on Jun. 22, 2020, which is a continuation-in-part of U.S. application Ser. No. 16/315,984 filed on Jan. 7, 2019, which is a national phase application of an international application, PCT/JP2017/023224 filed on Jun. 23, 2017, which claims the benefit of Japanese Application No. 2016-137650 filed on Jul. 12, 2016, all of which are incorporated by reference in their entirety.

TECHNICAL FIELD

The present invention relates to an engine including an exhaust bypass channel and an intake bypass channel of a turbocharger.

BACKGROUND ART

In a known engine, a bypass channel of a turbocharger is provided with a valve for adjusting the air volume. Patent Literatures 1 and 2 (PTLs 1 and 2 disclose engines of this type.

The engine of PTL 1 includes an intake manifold, an exhaust manifold, a main fuel injection valve that injects liquid fuel to the cylinder for combustion, a gas injector that mixes gaseous fuel with air supplied from the intake manifold, a turbocharger that compresses air, and an intercooler that cools the compressed air compressed in the turbocharger and supplies the cooled compressed air to the intake manifold. The engine of PTL 1 is configured such that a main throttle valve is provided at the connection between a turbocharger outlet and an intercooler inlet, and an exhaust bypass vale is disposed in an exhaust bypass channel connecting an exhaust manifold outlet and a turbocharger outlet to each other. This configuration of PTL 1 is intended to control the air volume responsively with respect to a load variation when the engine is operated in a gas mode.

The engine of PTL 2 includes a main turbocharger, a subturbocharger, an intake switching valve that opens and closes an intake passage disposed downstream of a compressor of the subturbocharger, and an exhaust switching valve that opens and closes an exhaust passage disposed downstream or upstream of a turbine of the subturbocharger. This engine includes a control device. The control device is configured as follows. The control device actuates only the main turbocharger by closing both the intake switching valve and the exhaust switching valve in a low-speed range, and actuates both the main turbocharger and the subturbocharger by opening both the intake switching valve and the exhaust switching valve in a high-speed range. When the low-speed range shifts to the high-speed range, the control device controls an exhaust bypass valve disposed downstream or upstream of the subturbocharger such that the exhaust bypass valve is open to a small degree and controls an intake bypass valve disposed in an intake bypass passage bypassing a compressor of the subturbocharger such that the intake bypass valve is closed before opening of the exhaust switching valve to thereby increase a run-up revolution speed of the subturbocharger. The engine of PTL 2 includes a first intake temperature sensor disposed at a compressor inlet of the subturbocharger and a second intake temperature sensor disposed at a compressor outlet of the subturbocharger and the intake switching valve. The engine includes a failure determination means for causing a display means to display that a failure of the intake bypass valve occurs at the closed valve side if the intake temperature value from the first intake temperature sensor is a predetermined first set value or more while the exhaust bypass valve is controlled to open to a small degree or if the intake temperature value from the second intake temperature sensor is a predetermined second set value or more while the exhaust bypass valve is controlled to open to a small degree. When a failure of the intake bypass valve occurs at the closed side, this configuration of PTL 2 enables early detection of this failure and issues an alarm of this failure to a driver of the vehicle.

CITATION LIST

Patent Literatures

PTL 1: Japanese Patent Application Laid-Open No. 2015-229997

PTL 2: Japanese Patent Application Laid-Open No. H04 (1992)-164125

SUMMARY OF INVENTION

Technical Problem in an engine that controls the air volume by including a valve bypassing a turbocharger as the configuration of PTL 1 described above, when a failure of the valve occurs, combustion control might not be performed appropriately PTL 1, however, does not mention any provision for such a failure.

On the other hand, in the configuration of PTL 2, the temperature near the intake bypass valve is measured so as to determine a failure of the intake bypass valve. The configuration of PTL 2, however, can detect a failure of the value in a closed state but cannot detect a failure of the valve in an open state.

As described above, in the configurations of PTLs 1 and 2 described above, a failure of a valve for adjusting the air volume cannot be detected appropriately, and improvement is needed in this respect.

Some aspects of the present invention have been made in view of the foregoing circumstances, and have an object of providing an engine capable of appropriately detecting an abnormality in control of the flow rate of a bypass channel of a turbocharger.

Solution to Problem and Advantages

Problems to be solved by the invention are as described above, and next, means for solving the problems and advantages thereof will be described.

In an aspect of the invention, an engine having the following configuration is provided. Specifically, the engine includes an intake manifold, an exhaust manifold, a turbocharger, an exhaust bypass valve, an intake bypass valve, an intake pressure sensor, and a control device. The intake manifold supplies air into a cylinder. The exhaust manifold discharges exhaust gas from the cylinder. The turbocharger compresses air by using exhaust gas from the exhaust manifold. The exhaust bypass valve is disposed in an exhaust bypass channel connecting an outlet of the exhaust manifold to an exhaust outlet of the turbocharger to each other. The intake bypass valve is disposed in an intake bypass channel connecting an inlet of the intake manifold and an inlet of the turbocharger to each other. The engine has at least one of the intake bypass channel and the exhaust bypass channel. A control device that performs feedback control by outputting an instruction value of a valve opening degree of at least one of the exhaust bypass valve and the intake bypass valve such that the value detected by the intake pressure sensor approaches a set target pressure of the intake manifold. The intake pressure sensor detects a pressure of the intake manifold. If an instruction value indicating an upper limit or a lower limit of the valve opening degree is continuously output for a predetermined time or more with respect to the exhaust bypass valve or the intake bypass valve as a target of the feedback control, the control device is capable of determining that an abnormality occurs in one of the exhaust bypass valve and the intake bypass valve.

Accordingly, it is possible to detect the present of a valve that can be neither opened nor closed in the exhaust bypass valve and the intake bypass valve, irrespective of a state where the valve is opened or closed. Consequently, an operator can be urged early to cope with an abnormality in airflow rate control.

The engine preferably has the configuration as follows. Specifically, the engine includes a gas injector and a fuel injection valve. The gas injector injects gas fuel with air supplied from the intake manifold and mixes the gas fuel with the air. The fuel injection valve injects liquid fuel to the cylinder. The engine can be driven while being switched between a premixed combustion mode in which the gas fuel injected from the gas injector and mixed with air is caused to flow into a combustion chamber of the cylinder and a diffusion combustion mode in which combustion occurs by injection of the liquid fuel by the fuel injection valve into the combustion chamber. If it is determined that an abnormality occurs in one of the exhaust bypass valve and the intake bypass valve dining driving in the premixed combustion mode, the control device switches from the premixed combustion mode to the diffusion combustion mode.

Accordingly, it is possible to prevent driving of the engine in the gas mode in a state where a failure occurs in at least one of the exhaust bypass valve and the intake bypass valve. As a result, continuity of driving of the engine can be maintained.

DESCRIPTION OF EMBODIMENTS

Figure 1:
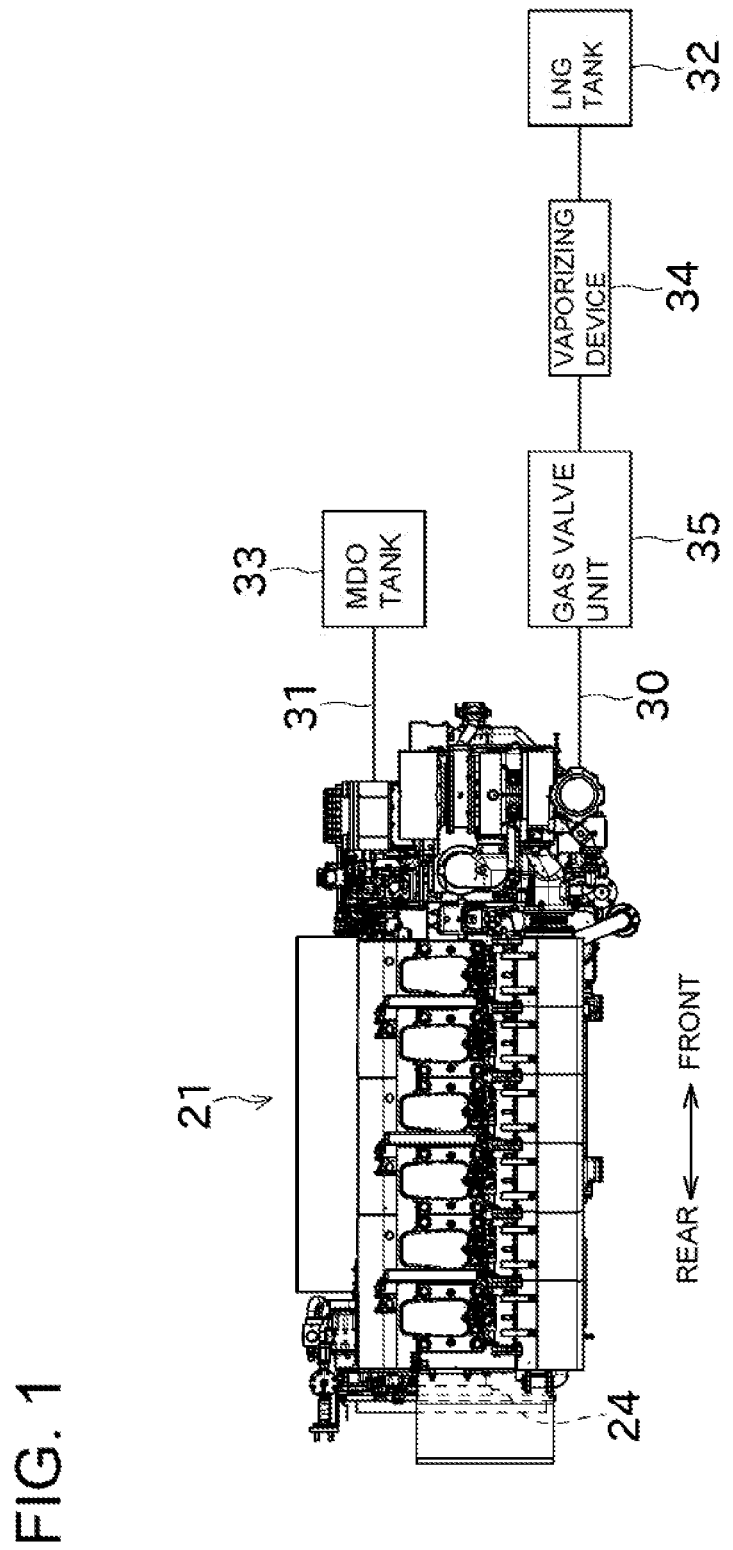
FIG. 1 A view schematically illustrating an engine and fuel supply paths of two systems according to one embodiment of the present invention.
Figure 2:
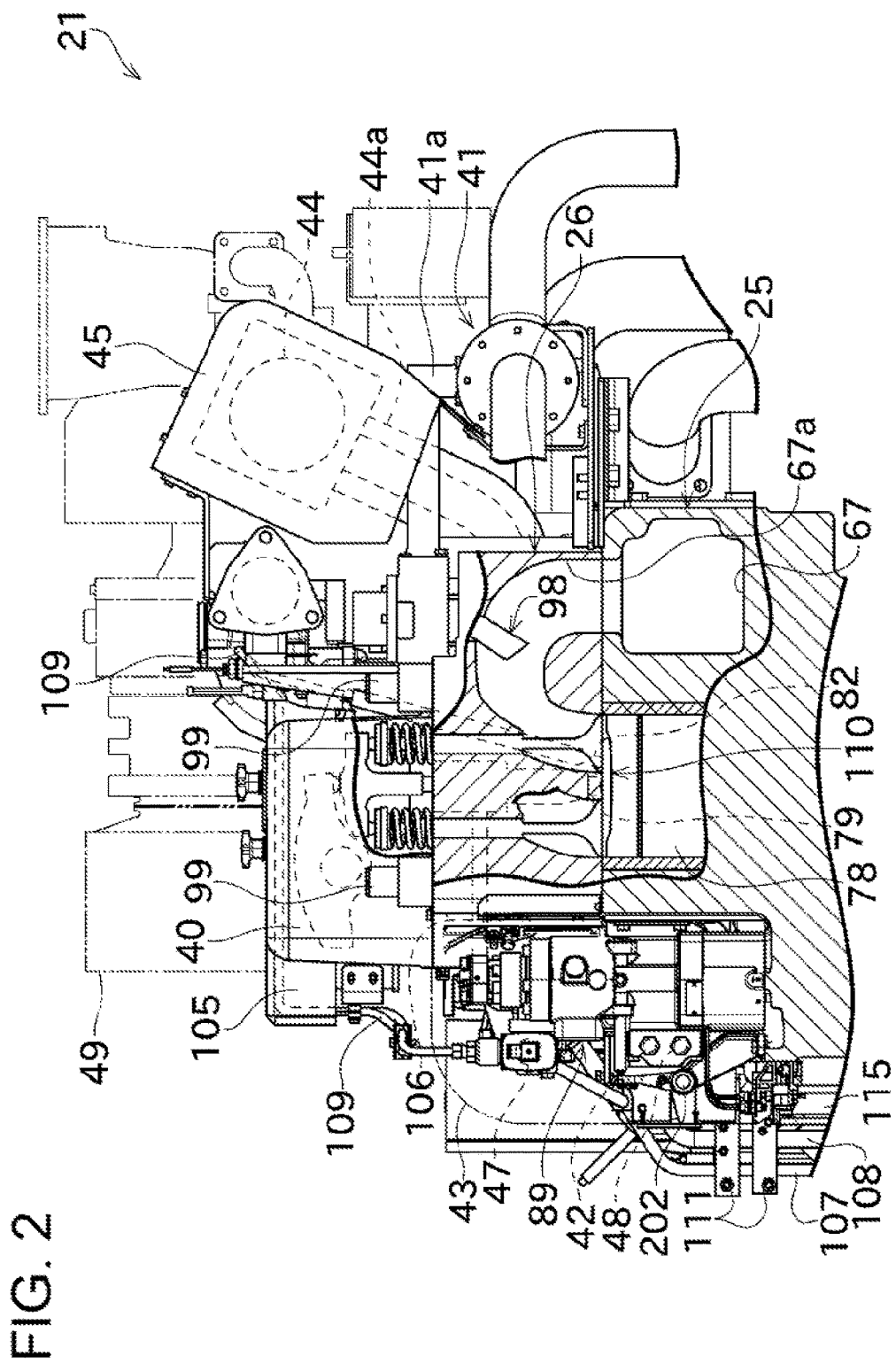
FIG. 2 A partial rear cross-sectional view illustrating a configuration around a combustion chamber in detail.
Figure 3:
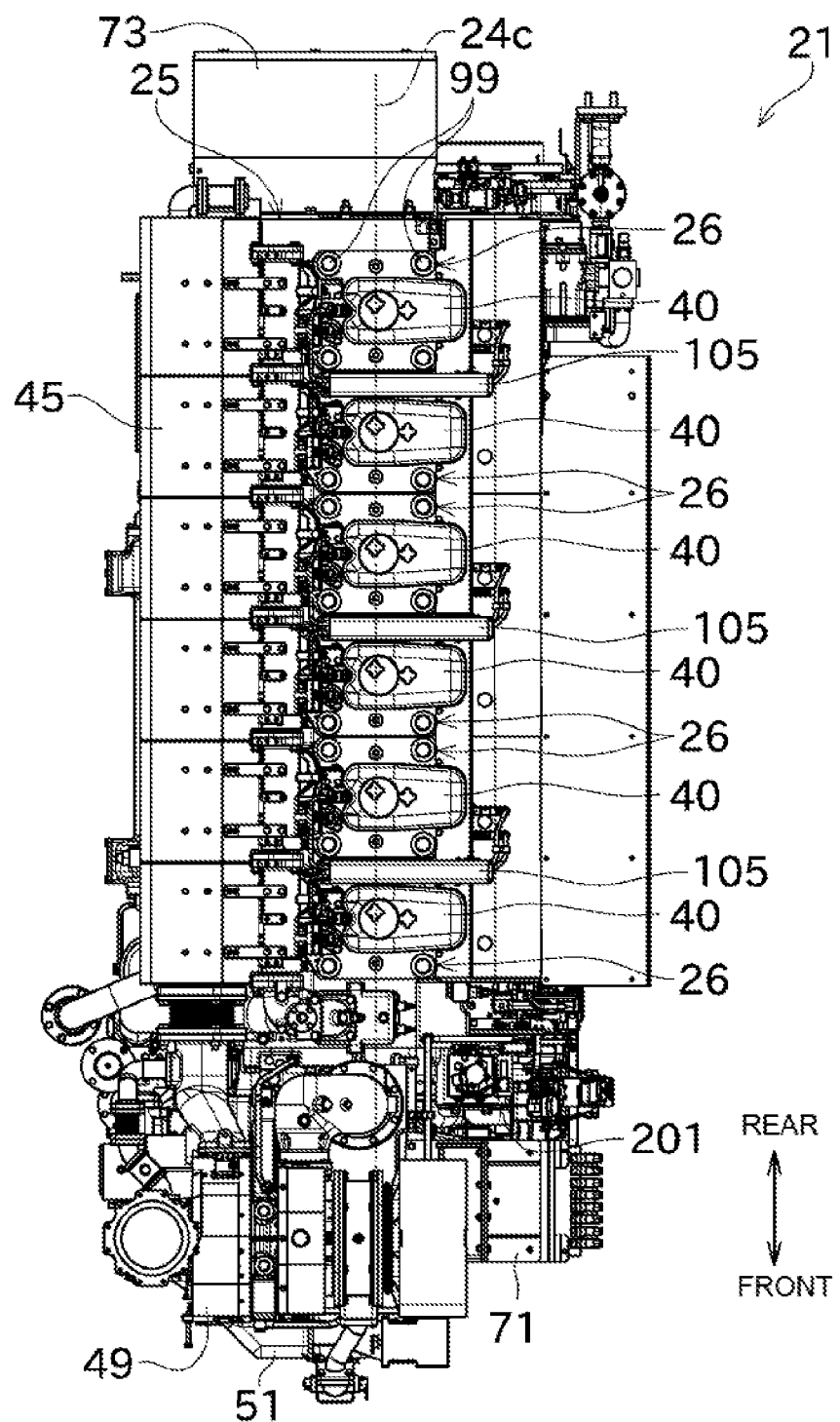
FIG. 3 A plan view of the engine.
Figure 4:
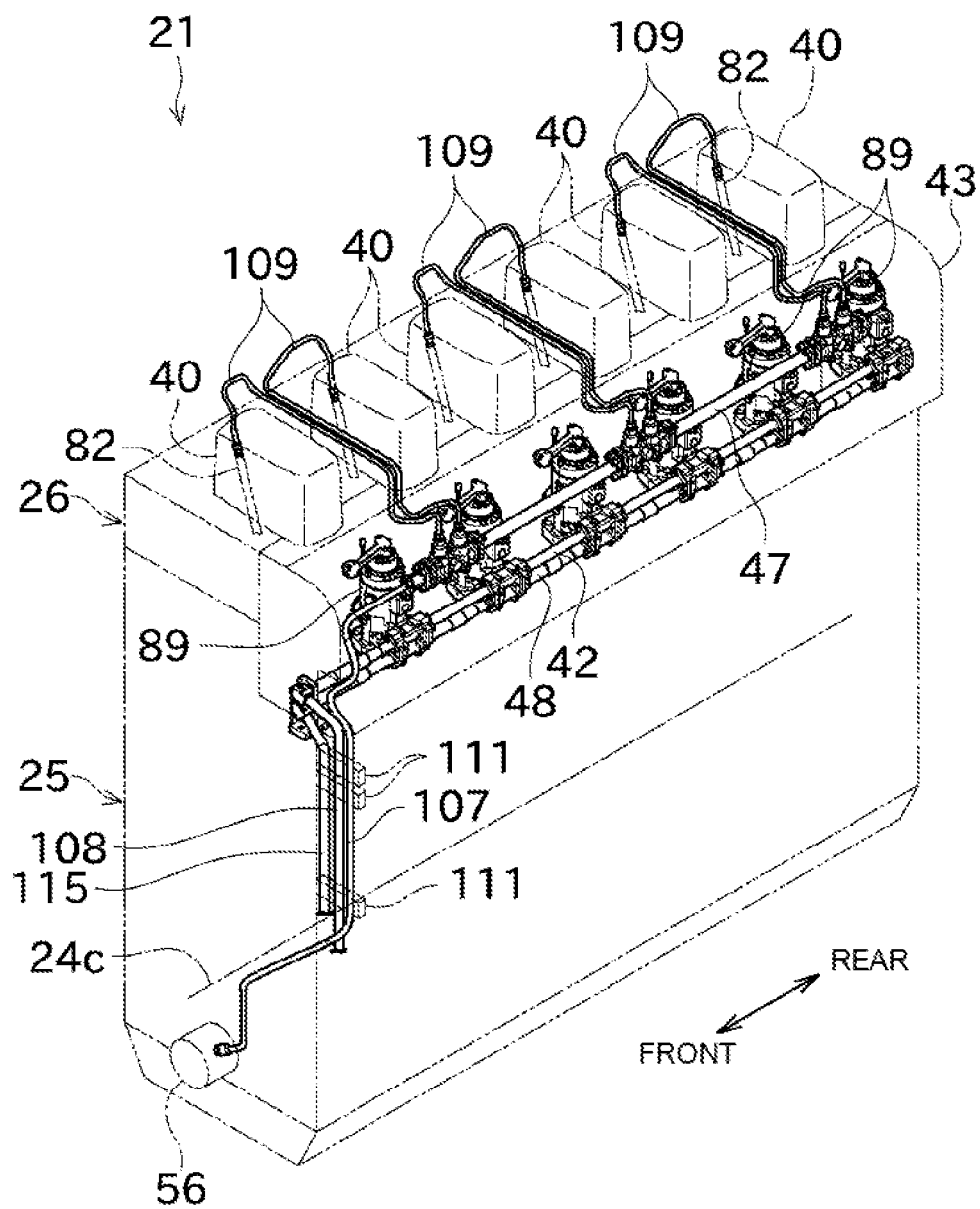
FIG. 4 A schematic front perspective view illustrating a liquid fuel supply path.

An embodiment of the present invention will be described with reference to the drawings. FIG. 1 is a view schematically illustrating an engine 21 and fuel supply paths 30 and 31 of two systems according to one embodiment of the present invention. FIG. 2 is a partial rear cross-sectional view illustrating a configuration around a combustion chamber 110 in detail. FIG. 3 is a plan view of the engine 21. FIG. 4 is a schematic front perspective view illustrating a liquid fuel supply path.

The engine (multi-cylinder engine) 21 according to this embodiment illustrated in FIG. 1 is a so-called dual fuel engine operable in both a premixed combustion system in which gaseous fuel mixed with air is caused to flow into combustion chambers and a diffusion combustion system that injects liquid fuel into the combustion chambers for combustion. The engine 21 according to this embodiment is mounted to an inner bottom plate of an engine room of an unillustrated ship with a base interposed therebetween, and serves as a driving source of an unillustrated propulsive and power generating mechanism of the ship.

A crank shaft 24 serving as an engine output shaft projects rearward from a rear end of the engine 21. An unillustrated speed-reducer is coupled to one end of the crank shaft 24 to enable power transfer. The speed reducer is sandwiched between the crank shaft 24 and an unillustrated propeller shaft of the ship, and the propeller shaft is disposed coaxially with the crank shaft 24. A propeller for generating propulsive power of the ship is attached to an end of the propeller shaft. The speed-reducer includes a PTO shaft, and an unillustrated shaft-driving power generator is coupled to the shaft to enable power transfer.

This configuration enables a driving force of the engine 21 to be branched into the propeller shaft and the shaft-driving power generator and transferred through the speed-reducer. Accordingly, propulsive power of the ship is generated, and electric power generated by driving the shaft-driving power generator is supplied to electric circuits in the ship.

Next, the engine 21 will be described in detail with reference to the drawings. The engine 21 is a dual fuel engine as described above, and can be driven while selecting one of a premixed combustion system in which fuel gas such as natural gas is mixed with the air for combustion and a diffusion combustion system in which liquid fuel (fuel oil) such as heavy oil is diffused for combustion.

In the following description, a driving mode by the premixed combustion system (premixed combustion mode) will be sometimes referred to as a "gas mode," and a driving mode by the diffusion combustion system (diffusion combustion mode) will be sometimes referred to as a "diesel mode." In the gas mode, environmentally hazardous substances (e.g., nitrogen oxides, sulfur oxides, and particulate matter) can be reduced by utilizing natural gas, whereas in the diesel mode, highly efficient driving can be achieved.

Positional relationship among the front, rear, left, and right in the configuration of the engine 21 will be described below with a side connected to the speed-reducer being defined as a rear side. Accordingly, the front-rear direction (longitudinal direction) can be a direction parallel to the axis of the crank shaft 24, and the left-right direction (lateral direction) can be a direction perpendicular to the axis of the crank shaft 24. It should be noted that this description is not intended to limit the orientation of the engine 21, and the engine 21 can be placed in various orientations in accordance with application and others.

As illustrated in FIG. 1, the fuel supply paths of two systems 30 and 31 are connected to the engine 21. A gaseous fuel tank 32 for storing liquefied natural gas (LNG) is connected to one fuel supply path 30, whereas a liquid fuel tank 33 fur storing a marine diesel oil (MDO) is connected to the other fuel supply path 31. In this configuration, the fuel supply path 30 supplies fuel gas to the engine 21, and the fuel supply path 31 supplies fuel oil to the engine 21.

In the fuel supply path 30, a gaseous fuel tank 32 that stores gaseous fuel in a liquefied state, a vaporizing device 34 that vaporizes the liquefied fuel in the gaseous fuel tank 32, and a gas valve unit 35 that adjusts the supply rate of fuel gas from the vaporizing device 34 to the engine 21, are arranged in this order from the upstream side.

As illustrated in FIGS. 2 and 4, the engine 21 is an in-line multi-cylinder engine configured by attaching cylinder heads 26 onto a cylinder block 25. The crank shaft 24 is rotatably supported. on a lower portion of the cylinder block 25 with an axis 24c oriented in the front-rear direction as illustrated FIG. 4.

In the cylinder block 25, a plurality of (six in this embodiment) cylinders are arranged in a line (in series) along the axis of the crank shaft 24. As illustrated in FIG. 2, each cylinder houses a piston 78 so that the pistons 78 are slidable in the top-bottom direction. This piston 78 is coupled to the crank shaft 24 through an unillustrated rod.

As illustrated in FIG. 3, the six cylinder heads 26 are attached to the cylinder block 25 to cover the cylinders individually from above. The cylinder heads 26 are provided to the individual cylinders, and are fixed to the cylinder block 25 using head bolts 99. As illustrated in FIG. 2, in each cylinder, the combustion chamber 110 is defined in space surrounded by the upper surface of the piston 78 and the cylinder head 26.

As illustrated in FIG. 3, a plurality of head covers 40 correspond to the individual cylinders and are arranged on the cylinder heads 26 in a line along the direction of the axis 24c of the crank shaft 24 (front-rear direction). As illustrated in FIG. 2, each of the head covers 40 houses a valve mechanism constituted by a push rod, a rocker arm, and so forth in order to operate an intake valve and an exhaust valve. In a state where the intake valves are open, intake air from an intake manifold 67 can be taken in the combustion chambers 110. In a state where the exhaust valves are open, exhaust air from the combustion chambers 110 can be emitted to an exhaust manifold 44.

As illustrated in FIG. 2, the upper end of a pilot fuel injection valve 82 described later is disposed near the right of each head cover 40. The pilot fuel injection valves 82 are inserted in the cylinder heads 26, and extend obliquely downward toward the corresponding combustion chambers 110.

As illustrated in FIG. 2, a gas manifold 41 for distributing and supplying gaseous fuel to the combustion chambers 110 of the cylinders during driving in the gas mode (premixed combustion mode) is provided at the right of the cylinder heads 26. The gas manifold 41 extends in the front-rear direction along the right side surfaces of the cylinder heads 26. Six gas branch pipes 41a corresponding to the combustion chambers 110 of the cylinders are connected to the gas manifold 41, and as illustrated in FIG. 2, gas injectors 98 for injecting gaseous fuel are provided at the front ends of the gas branch pipes 41a. The front ends of the gas injectors 98 face intake branch pipes 67a corresponding to the cylinders and formed inside the cylinder heads 26. By injecting gaseous fuel from the gas injectors 98, the gaseous fuel can be supplied to the intake branch pipes 67a of the intake manifold 67.

As illustrated in FIGS. 2 and 4, a liquid fuel supply rail pipe 42 for distributing and supplying liquid fuel to the combustion chambers 110 of the cylinders during driving in the diesel mode (diffusion combustion mode) is disposed at the left of the cylinder block 25. The liquid fuel supply rail pipe 42 extends in the front-rear direction along the left side surface of the cylinder block 25. Liquid fuel supplied to the liquid fuel supply rail pipe 42 is distributed and supplied to fuel supply pumps 89 corresponding to the cylinders. As illustrated in FIG. 2, each cylinder is provided with a main fuel injection valve 79 that injects liquid fuel supplied from the fuel supply pump 89. The main fuel injection valves 79 are inserted in the cylinder heads 26 vertically from above the cylinder heads 26, the upper ends of the main fuel injection valves 79 are disposed inside the head covers 40, and the lower ends of the main fuel injection valves 79 face the combustion chambers 110 of the cylinders. The fuel supply pumps 89 and the main fuel injection valves 79 are connected to each other through liquid fuel supply paths 106 formed in the cylinder heads 26.

A liquid fuel return aggregate pipe 48 for collecting redundant fuel returned from the fuel supply pumps 89 is disposed near the bottom of the liquid fuel supply rail pipe 42. The liquid fuel return aggregate pipe 48 is disposed in parallel with the liquid fuel supply rail pipe 42, and connected to the fuel supply pumps 89. A fuel return pipe 115 for returning liquid fuel to the liquid fuel tank 33 is connected to an end of the liquid fuel return aggregate pipe 48.

As illustrated in FIGS. 2 and 4, a pilot fuel supply rail pipe 47 for distributing and supplying pilot fuel to the combustion chambers 110 of the cylinders in order to ignite gaseous fuel in combustion in the gas mode (premixed combustion mode) is disposed at the left of the cylinder block 25 and above the liquid fuel supply rail pipe 42. The pilot fuel supply rail pipe 47 extends in the front-rear direction along the left side surface of the cylinder block 25. As illustrated in FIGS. 2 and 4, the cylinders are provided with the pilot fuel injection valves 82 for injecting liquid fuel (pilot fuel) supplied from the pilot fuel supply rail pipe 47. The pilot fuel injection valves 82 are inserted in the cylinder heads 26 vertically from above the cylinder heads 26, the upper ends of the pilot fuel injection valves 82 are disposed immediately at the right side of the head covers 40, and the lower ends of the pilot fuel injection valves 82 face the combustion chambers 110 of the cylinders. As illustrated in FIG. 4, pilot fuel branch pipes 109 corresponding to the cylinders branch off from the pilot fuel supply rail pipe 47. The pilot fuel branch pipes 109 pass between the head covers 40 arranged side by side, and are connected to the upper ends of the pilot fuel injection valves 82. The pilot fuel branch pipes 109 are covered with a branch pipe cover 105 for preventing leaked fuel from scattering.

As illustrated in FIGS. 2 and 4, a step is formed on an upper portion of the left side surface of the engine 21 constituted by the cylinder block 25 and the cylinder heads 26. The pilot fuel supply rail pipe 47, the liquid fuel supply rail pipe 42, and the fuel supply pumps 89 are disposed on this step. A side cover 43 is attached to the cylinder block 25 and the cylinder heads 26 to cover the step. The pilot fuel supply rail pipe 47, the liquid fuel supply rail pipe 42, and the fuel supply pumps 89 are covered with the side cover 43.

As illustrated in FIG. 3, for example, a speed adjuster 201 for adjusting the fuel injection rate of the fuel supply pumps 89 is disposed near one end in the direction in which the fuel supply pumps 89 are arranged. The speed adjuster 201 is capable of rotating a control transfer shaft 202 disposed in parallel with the liquid fuel supply rail pipe 42 and other components inside the side cover 43. The control transfer shaft 202 is coupled to a control rack of the fuel supply pumps 89 in the same number as that of the number of the cylinders. The speed adjuster 201 rotates the control transfer shaft 202 to thereby displace the control rack of the fuel supply pumps 89 so that the pumping speed of the fuel supply pumps 89 (injection rate of the main fuel injection valve 79) can be changed.

As illustrated in FIG. 2, the exhaust manifold 44 for collecting exhaust air generated by combustion in the combustion chambers 110 of the cylinders and emitting the exhaust air to the outside is disposed in parallel with the gas manifold 41 above the right of cylinder heads 26 and above the gas manifold 41. The outer periphery of the exhaust manifold 44 is covered with a heat shielding cover 45. As illustrated in FIG. 2, exhaust branch pipes 44*a* corresponding to the cylinders are connected to the exhaust manifold 44. The exhaust branch pipes 44*a* communicate with the combustion chambers 110 of the cylinders.

The intake manifold 67 for distributing and supplying outside air (intake air to the combustion chambers 110 of the cylinders is disposed in parallel with the gas manifold 41 inside the cylinder block 25 and near the cylinder block 25. As illustrated in FIG. 2, the six intake branch pipes 67*a* branching off from the intake manifold 67 are formed inside the cylinder heads 26 and communicate with the individual combustion chambers 110.

With this configuration, in driving in the diesel mode (diffusion combustion mode), an appropriate amount of liquid fuel is injected from the main fuel injection valves 79 into the combustion chambers 110 at an appropriate timing when air supplied to the cylinders from the intake manifold 67 is compressed by sliding of the pistons 78. Injection of liquid fuel into the combustion chambers 110 causes the pistons 78 to reciprocate in the cylinders with propulsive power obtained by combustion in the combustion chambers 110, and the reciprocating movement of the pistons 78 is converted to rotation movement of the crank shaft 24 through a rod, thereby obtaining a driving force.

On the other hand, in driving in the gas mode (premixed combustion system), gaseous fuel from the gas manifold 41 is injected from the gas injectors 98 into the intake branch pipes 67*a* so that air supplied from the intake manifold 67 and the gaseous fuel are mixed. At an appropriate timing when the air mixture of the air introduced into the cylinders and the gaseous fuel is compressed by sliding of the pistons 78, a small amount of pilot fuel is injected from the pilot fuel injection valves 82 into the combustion chambers 110 so that the gaseous fuel is ignited. The pistons 78 reciprocates in the cylinders with propulsive power Obtained by combustion in the combustion chambers 110, and the reciprocating movement of the pistons 78 is converted to rotation movement of the crank shaft 24 through the rod, thereby obtaining a driving force.

In either case of driving in the diesel mode and driving in the gas mode, exhaust air generated by combustion is pushed out from the cylinders by movement of the pistons 78, and collected in the exhaust manifold 44, and then emitted to the outside.

The front end surface (front surface) of the engine 21 is provided with a fuel oil pump 56, an unillustrated cooling water pump, and a lubricating oil pump that surround a front end portion of the crank shaft 24. A rotative force is appropriately transferred from the crank shaft 24 so that the cooling water pump, the lubricating oil pump, and the fuel of pump 56 provided at the outer periphery of the crank shaft 24 are driven.

The fuel oil pump 56 illustrated in FIG. 4 is driven to rotate so that fuel oil (liquid fuel) supplied from the liquid fuel tank 33 illustrated in FIG. 1 is sent to the pilot fuel supply rail pipe 47 by way of a pilot fuel supply main pipe 107. A pilot fuel filter for filtering fuel oil is provided in an intermediate portion of a fuel path from the liquid fuel tank 33 to the fuel oil pump 56.

An unillustrated fuel oil pump (different from the fuel oil pump 56) is driven to rotate with rotation of the crank shaft 24 so that this fuel pump sucks fuel oil from the liquid fuel tank 33, and sends the fuel oil to the liquid fuel supply rail pipe 42 by way of a liquid fuel supply main pipe 108 illustrated in, for example, FIG. 4. A main fuel filter for filtering fuel oil is disposed in an intermediate portion of a supply path of fuel oil from the liquid fuel tank 33 to the liquid fuel supply rail pipe 42.

As illustrated in FIG. 4, the pilot fuel supply main pipe 107, the liquid fuel supply main pipe 108, and the fuel return pipe 115 are disposed immediately ahead of the cylinder block 25 and extend along the left side surface of the cylinder block 25. The pilot fuel supply main pipe 107, the liquid fuel supply main pipe 108, and the fuel return pipe 115 extend in the top-bottom direction along the left side surface of the cylinder block 25 through a plurality of clamp members 111 projecting leftward from the front end surface of the cylinder block 25.

Figure 6:
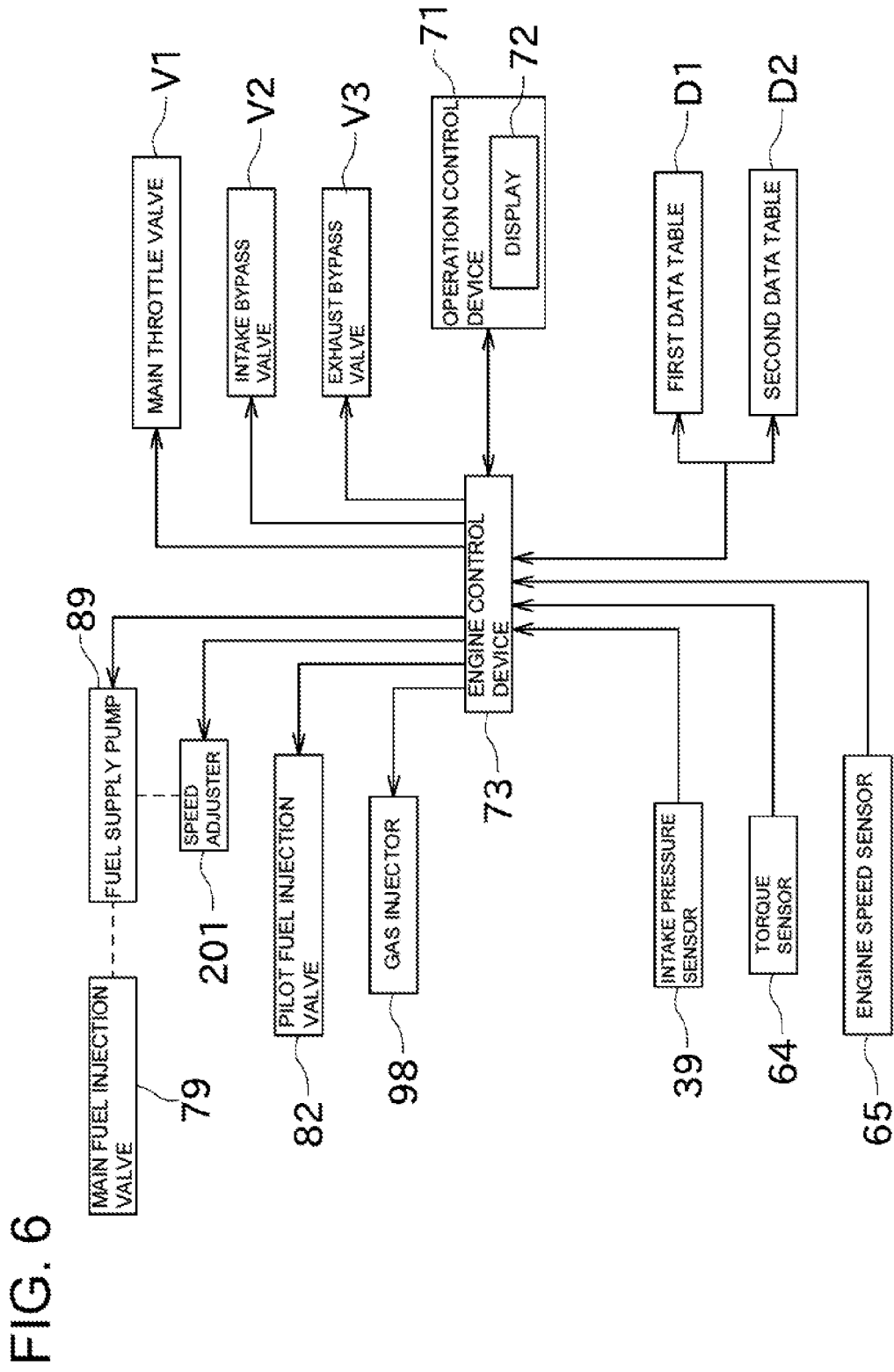
FIG. 6 A block diagram illustrating an electric configuration for controlling the engine.

An engine control device (control device) 73 for controlling operation of components of the engine 21 is provided near the right of the rear of the cylinder block 25 with an unillustrated support member interposed therebetween. As illustrated in FIG. 6, the engine control device 73 is configured to acquire data from sensors (e.g., a pressure sensor and a torque sensor) provided in components of the engine 21 and control operations (e.g., fuel injection and change of the opening degree of the flow-rate control valve) of the engine 21.

Figure 5:
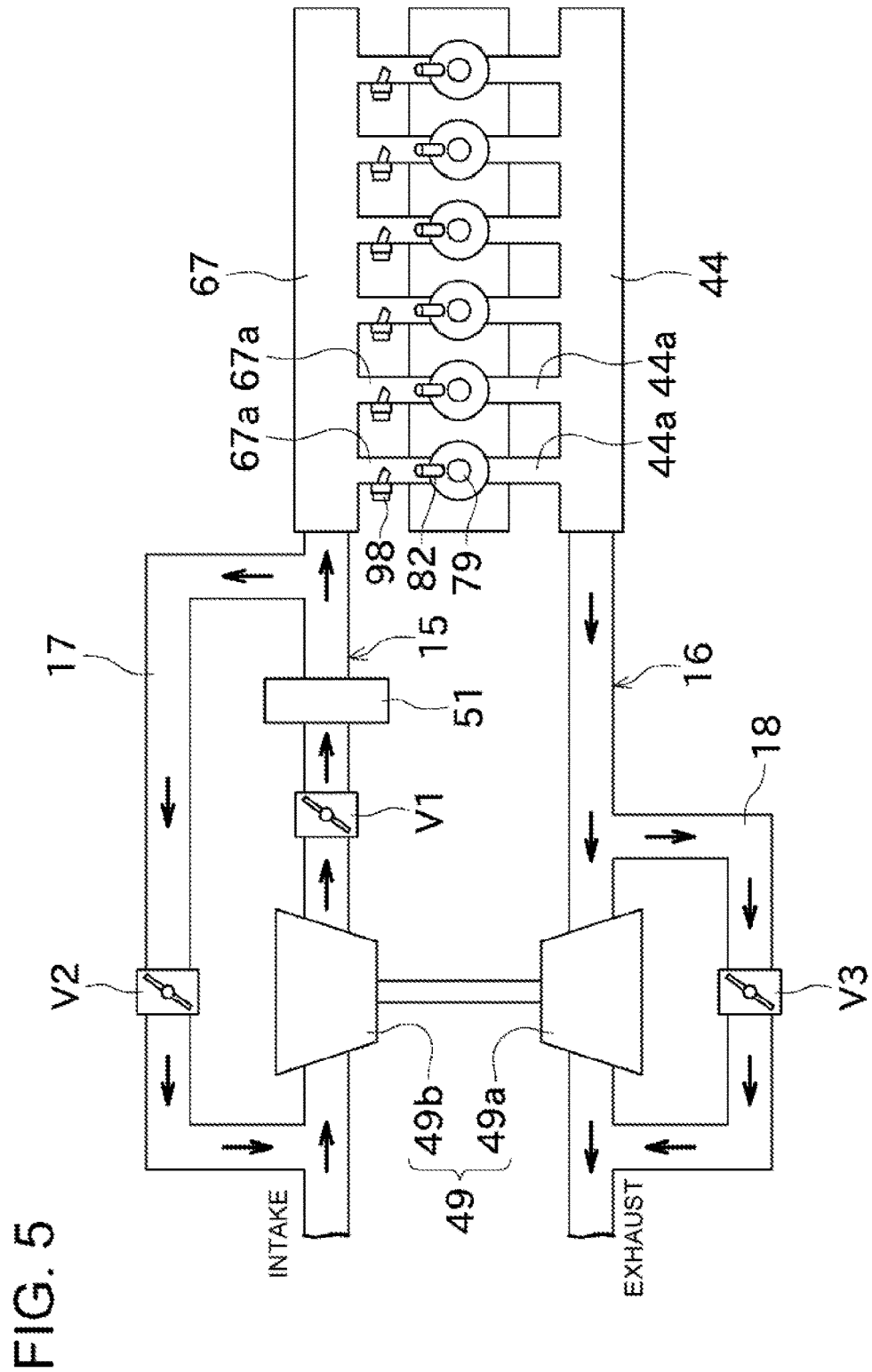
FIG. 5 A view illustrating a configuration of intake and exhaust systems of the engine.

Next, a configuration for intaking and exhausting air in the engine 21 will be described with reference to FIG. 5. FIG. 5 is a schematic view illustrating a configuration of intake and exhaust systems of the engine 21.

As illustrated in FIG. 5, six cylinders are arranged in a line in the engine 21. Each cylinder is connected to the intake manifold 67 through the intake branch pipe 67*a*, and connected to the exhaust manifold 44 through the exhaust branch pipe 44*a*.

The intake manifold 67 is connected to an intake channel 15 communicating with the outside of the engine 21 to be capable of taking outside air into the cylinders. A compressor 49*b* of a turbocharger 49 and an intercooler 51 are disposed in an intermediate portion of the intake channel 15.

A main throttle valve V1 for adjusting the flow rate of air supplied to the intake manifold 67 is disposed between the compressor 49*b* and the intercooler 51. The main throttle valve V1 is configured as a flow-rate control valve, and is configured to enable control of the opening degree of the valve based on an electrical signal from the engine control device 73.

The intake channel 15 is provided with an intake bypass channel 17 connecting an air outlet of the intercooler 51 and an air inlet of the compressor 49*b*. A part of air that has passed through the compressor 49*b* is circulated again by way of the intake bypass channel 17. The intake bypass channel 17 is provided with an intake bypass valve V2 for adjusting the flow rate of air passing through the intake bypass channel 17. The intake bypass valve V2 is configured as a flow-rate control valve in a manner similar to the main throttle valve V1, and is configured such that the opening degree of the intake bypass valve V2 is controllable based on an electrical signal from the engine control device 73. By changing the opening degree of the intake bypass valve V2, the flow rate of air supplied to the intake manifold 67 can be adjusted.

The exhaust manifold 44 is connected to an exhaust channel 16 communicating with the outside of the engine 21 and is capable of emitting air from the cylinders to the outside. A turbine 49a of the turbocharger 49 is disposed in an intermediate portion of the exhaust channel 16.

The exhaust channel 16 is provided with an exhaust bypass channel 18 connecting an exhaust outlet of the exhaust manifold 44 and an exhaust outlet of the turbine 49a (bypassing the turbine 49a). A part of exhaust air sent from the exhaust manifold 44 to the exhaust channel 16 reaches a portion downstream of the exhaust outlet of the turbine 49a by way of the exhaust bypass channel 18 and is emitted to the outside. The exhaust bypass channel 18 is provided with an exhaust bypass valve V3 for adjusting the flow rate of exhaust air passing through the exhaust bypass channel 18. The exhaust bypass valve V3 is configured as a flow-rate control valve in a manner similar to the main throttle valve V1, and is configured such that the opening degree of the intake bypass valve V3 is controllable based on an electrical signal from the engine control device 73. The flow rate of exhaust air flowing into the turbine 49a is adjusted by changing the valve opening degree of the exhaust bypass valve V3 so that the compression amount of air in the compressor 49b can be adjusted. That is, the flow rate of air supplied to the intake manifold 67 can be adjusted by adjusting the valve opening degree of the exhaust bypass valve V3.

Figure 7:
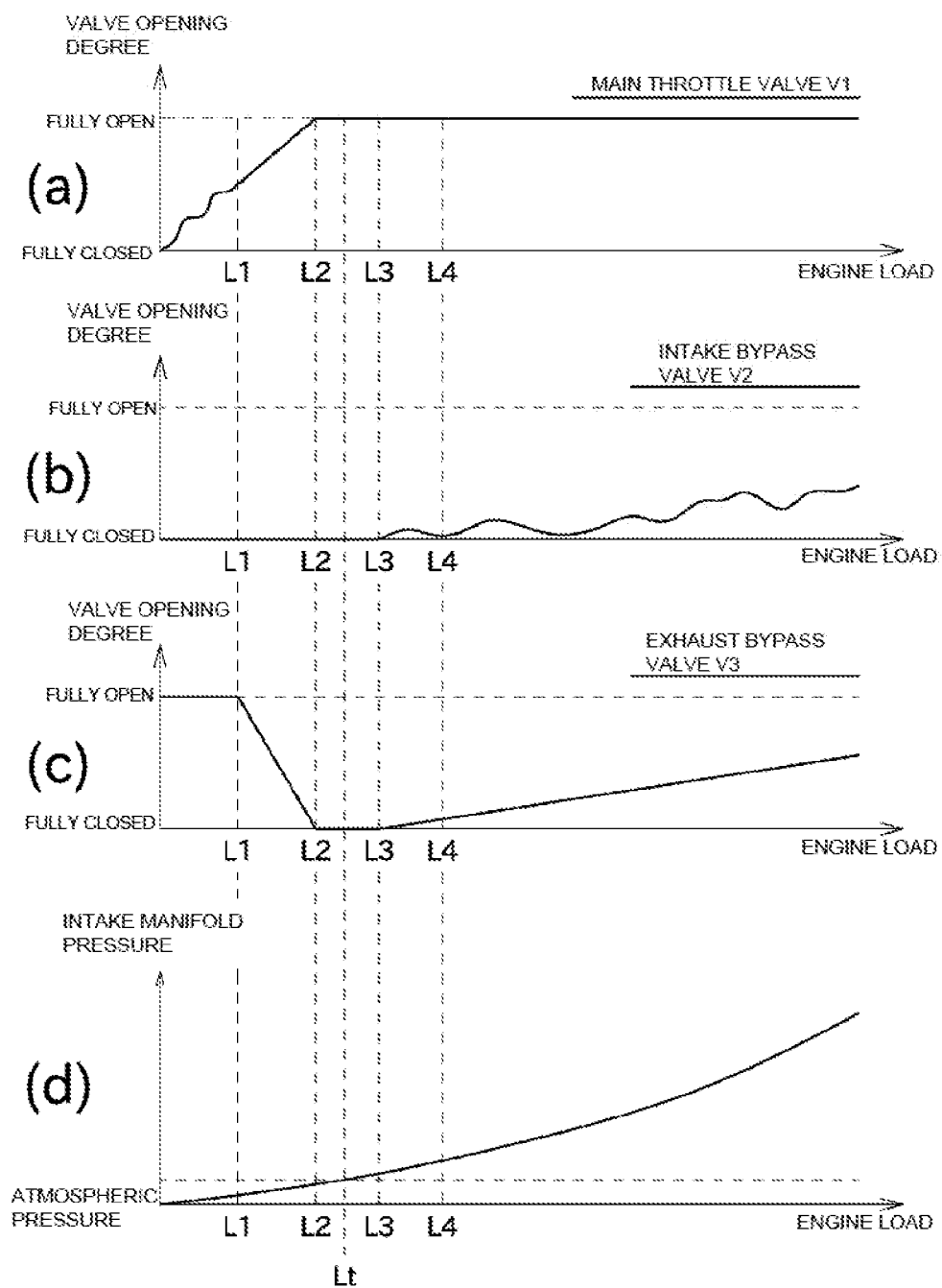
FIG. 7 A graph for describing control of adjusting an intake flow rate in an intake manifold when the engine is driven in a gas mode.

Next, feedback control in the valve opening degree of the flow-rate control valve will be described with reference to FIGS. 6 and 7. FIG. 6 is a block diagram illustrating an electric configuration for controlling the engine 21. FIG. 7 is a graph for describing control of adjusting an intake flow rate in the intake manifold 67 when the engine 21 is driven in the gas mode.

As illustrated in FIG. 6, the engine control device 73 is configured to control the pilot fuel injection valves 82, the fuel supply pumps 89, and the gas injectors 98. The engine control device 73 controls opening and closing of the pilot fuel injection valves 82 to supply liquid fuel (pilot fuel) to the combustion chambers 110. The engine control device 73 controls opening and closing of the control valve of the fuel supply pumps 89 to thereby supply liquid fuel (main fuel) from the fuel supply pumps 89 to the combustion chambers 110 through the main fuel injection valves 79. The engine control device 73 controls the speed adjuster 201 to thereby adjust the injection amount of liquid fuel from the main fuel injection valves 79. The engine control device 73 can supply gaseous fuel to the intake branch pipes 67a of the intake manifold 67 by controlling the gas injectors 98.

The engine control device 73 is configured to control the main throttle valve V1, the intake bypass valve V2, and the exhaust bypass valve V3. As described above, the engine control device 73 controls the opening degrees of the main throttle valve V1, the intake bypass valve V2, and the exhaust bypass valve V3 to thereby adjust the flow rate of air flowing into the intake manifold 67.

As illustrated in FIG. 6, the engine control device 73 is configured to receive signals from the sensors provided in components of the engine 21. The engine control device 73 is configured to communicate with an engine-side operation control device 71.

The intake manifold 67 of the engine 21 is provided with an intake pressure sensor 39 for measuring an air pressure in the intake manifold 67. This intake pressure sensor 39 can be configured using a semiconductor strain gauge, for example, The intake pressure detected by the intake pressure sensor 39 is output to the engine control device 73.

A torque sensor 64 is attached to an appropriate location (e.g., near the crank shaft 24) of the engine 21. Examples of the torque sensor 64 include a flange-type sensor for detecting a torque using a strain gauge. An engine load (engine torque) detected by the torque sensor 64 is output to the engine control device 73.

An engine speed sensor 65 is attached to an appropriate location (e.g., the cylinder block 25) of the engine 21. The engine speed sensor 65 is constituted by, for example, a sensor and a sensor pulse generator, and can be configured to generate a pulse signal in accordance with rotation of the crank shaft 24. The engine speed detected by the engine speed sensor 65 is output to the engine control device 73.

In driving the engine 21 in the diesel mode, the engine control device 73 controls opening and closing of the control valves in the fuel supply pumps 89 to cause combustion in the cylinders at a predetermined timing. That is, the control valves of the fuel supply pumps 89 are opened in accordance with the injection timings of the cylinders so that fuel oil is injected into the cylinders through the main fuel injection valves 79, and combustion occurs in the cylinders. On the other hand, injection of fuel gas from the gas injectors 98 and injection of pilot fuel from the pilot fuel injection valves 82 are suspended in the diesel mode.

in the diesel mode, the engine control device 73 performs feedback control on the timing of injection from the main fuel injection valve 79 in each cylinder based on the engine load detected by the torque sensor 64 and the engine speed detected by the engine speed sensor 65. Accordingly, the crank shaft 24 of the engine 21 rotates at an engine speed in accordance with a propulsion speed of the ship so as to obtain a torque necessary for the propulsive and power generating mechanism of the ship. The engine control device 73 controls the valve opening degree of the main throttle valve V1 based on an air pressure in the intake manifold 67 detected by the intake pressure sensor 39. Accordingly, compressed air is supplied from the compressor 49b to the intake manifold 67 so as to obtain an airflow rate necessary for an engine output.

In the case of driving the engine 21 in the gas mode, the engine control device 73 controls opening and closing of the valves in the gas injectors 98 to supply fuel gas to the intake branch pipes 67a, thereby mixing the fuel gas with air from the intake manifold 67 and supplying premixed fuel to the cylinders. The engine control device 73 also controls opening and closing of the pilot fuel injection valves 82 and injects pilot fuel to the cylinders at a predetermined timing to thereby generate an ignition source so that combustion is performed in the cylinders supplied with the premixed gas. On the other hand, injection of main fuel from the main fuel injection valve 79 is suspended in the gas mode.

In the gas mode, the engine control device 73 performs feedback control on the injection flow rate of fuel gas by the gas injectors 98 and the timing of injection from the pilot fuel injection valves 82, based on the engine load detected by the torque sensor 64 and the engine speed detected by the engine speed sensor 65.

Based on the engine load detected by the torque sensor 64, the air pressure in the intake manifold 67 detected by the intake pressure sensor 39, and so forth, the engine control device 73 controls the valve opening degrees of the main throttle valve V1, the intake bypass valve V2, and the exhaust bypass valve V3, as illustrated in FIG. 7, for example.

First, control of the main throttle valve V1 will be described with reference to FIG. 7(a). In the graph of FIG. 7, L1, L2, L3, and L4 are predetermined specific values of the engine load (where L1<L2<L3<L4) and the specific value IA is an engine load corresponding to the boundary between a low-load region and an intermediate and high-load regions.

If the engine load is less than the specific value L1, the engine control device 73 sets a target pressure of the intake manifold 67 in accordance with the engine load based on the relationship shown in FIG. 7(d), and then performs PID control (feedback control) on the valve opening degree of the main throttle valve V1 such that an actual pressure detected by the intake pressure sensor 39 approaches the target pressure.

If the engine load is greater than or equal to the specific value L1 and less than the specific value L2, the engine control device 73 refers to a first data table D1 storing the valve opening degree of the main throttle valve V1 with respect to the engine load and performs map control such that the valve opening degree of the main throttle valve V1 reaches a degree corresponding to the engine load. The first data table D1 is defined such that the valve opening degree of the main throttle valve V1 gradually increases as the engine load increases.

If the engine load is greater than or equal to the specific value L2, the engine control device 73 performs control such that the main throttle valve V1 is fully open. The specific value L2 of the engine load is set to be lower than a value Lt at which the air pressure of the intake manifold 67 is an atmospheric pressure.

Then, control of the intake bypass valve V2 will be described with reference to FIG. 7(b).

If the engine load is less than the specific value L3, the engine control device 73 performs control such that the intake bypass valve V2 is fully closed.

If the engine load is greater than or equal to the specific value L3, the engine control device 73 sets a target pressure of the intake manifold 67 in accordance with the engine load based on the relationship shown in FIG. 7(d), and then performs PID control (feedback control) on the valve opening degree of the intake bypass valve V2 such that an actual pressure detected by the intake pressure sensor 39 approaches the target pressure.

Next, control of the exhaust bypass valve V3 will be described with reference to FIG. 7(c).

If the engine load is less than the specific value L1, the engine control device 73 performs control such that the exhaust bypass valve V3 is fully open.

If the engine load is greater than or equal to the specific value L1, the engine control device 73 refers to a second data table D2 storing the valve opening degree of the exhaust bypass valve V3 with respect to the engine load and performs map control such that the valve opening degree of the exhaust bypass valve V3 reaches the degree corresponding to the engine load. The second data table D2 is defined such that the valve opening degree of the exhaust bypass valve V3 gradually decreases as the engine load increases from the specific value L1 to the specific value L2, the exhaust bypass valve V3 is fully closed from the specific value L2 to the specific value L3, and the opening degree of the exhaust bypass valve V3 gradually increases as the engine load increases from the specific value L3.

As described above, the engine control device 73 adjusts the air pressure of the intake manifold 67 by controlling the main throttle valve V1, the intake bypass valve V2, and the exhaust bypass valve V3. Accordingly, compressed air is supplied from the compressor 49b to the intake manifold 67 so as to obtain an airflow rate necessary for an engine output, and an air-fuel ratio to fuel gas supplied from the gas injectors 98 can be adjusted to a value in accordance with an engine output.

In the dual fuel engine as described in this embodiment, the air-fuel ratio differs between the diesel mode and the gas mode. With the same level of a load, the required airflow rate in the gas mode is smaller than that in the diesel mode. Thus, the turbocharger 49 basically needs to be designed to be used in the diesel mode, whereas in the gas mode, the turbocharger 49 also needs to supply air at a flow rate suitable for the air-fuel ratio in the gas mode.

In this regard, in this embodiment, the configuration described above controls the valve opening degree of the intake bypass valve V2 in accordance with variations of the engine load during driving in the gas mode even in a case where the configuration of the turbocharger 49 is optimized for driving in the diesel mode. Accordingly, responsiveness in pressure control of the intake manifold 67 can be enhanced. Thus, even when the load varies, excess and deficiency of an air volume necessary for combustion can be avoided. Consequently, even when the turbocharger 49 optimized for driving in the diesel mode is used, the turbocharger 49 can be driven favorably in the gas mode.

The opening degree of the exhaust bypass valve V3 is controlled in accordance with variations of the engine load so that air in an air-fuel ratio necessary for combustion of fuel gas can be supplied to the engine 21. In addition, control of the intake bypass valve V2 showing high responsiveness is additionally performed so that response speed to a load variation can be increased in the gas mode. Thus, even with a variation of a load, problems such as knocking due to shortage of an air volume necessary for combustion can be avoided.

In this embodiment, if the engine load is the specific value L3 or more, map control is performed on the valve opening degree of one of the intake bypass valve V2 and the exhaust bypass valve V3, whereas PID control is performed on the valve opening degree of the other. However, in at least one of the intake bypass valve V2 and the exhaust bypass valve V3, an intended valve opening degree cannot be actually obtained in some cases because of fixing of a valve body to a valve seat or damage of a linkage mechanism coupling the driving source to the valve body in order to open and close the valve body.

In this regard, in this embodiment, the engine control device 73 is configured as follows. The engine control device 73 monitors an instruction value of a valve opening degree to be output to the bypass valve subjected to the PID control. If the instruction value remains at an upper limit or a lower limit of the valve opening degree for a predetermined time or more, the engine control device 73 determines that an abnormality occurs in at least one of the intake bypass valve V2 and the exhaust bypass valve V3.

For example, suppose the engine control device 73 outputs an instruction value instructing the valve opening degree to be at an approximately intermediate level to the exhaust bypass valve V3 as a result of map control on the exhaust bypass valve V3, but an abnormality occurs in the exhaust bypass valve V3, and the exhaust bypass valve V3 cannot be changed from a fully open state or a fully closed state irrespective of the instruction value. At this time, the engine control device 73 performs feedback control on the intake bypass valve V2 such that the pressure of the intake manifold 67 approaches a target pressure and outputs an instruction value as a result of the feedback control. However, since the exhaust bypass valve V3 is not at an intended valve opening degree, the air pressure of the intake manifold 67 cannot be practically controlled. Thus, because of characteristics of the PID control (feedback control), the instruction value of the valve opening degree output to the intake bypass valve V2 by the engine control device 73 finally reaches the upper limit or the lower limit in the control range, and this value continues.

Then, suppose the exhaust bypass valve V3 is normal and successfully reaches a valve opening degree of a given instruction value, but an abnormality occurs in the intake bypass valve V2 and the intake bypass valve V2 cannot be changed from a fully open state or a fully closed state irrespective of the given instruction value. In this case, the air pressure of the intake manifold 67 cannot be practically controlled by the intake bypass valve V2, and thus, the instruction value of the valve opening degree output to the intake bypass valve V2 by the engine control device 73 as a result of the PID control (feedback control) finally reaches the upper limit or the lower limit in the control range, and this value continues.

In consideration of this, if the state where the instruction value of the valve opening degree output to the intake bypass valve V2 as a result of the feedback control remains at the upper or lower limit in the control range for a predetermined time or more, the engine control device 73 determines that an abnormality occurs in at least one of the intake bypass valve V2 and the exhaust bypass valve V3, and causes a display 72 of the engine-side operation control device 71 to display the occurrence of the abnormality. In this manner, an abnormality in control of the airflow rate can be appropriately found to promote early measures.

Figure 8:
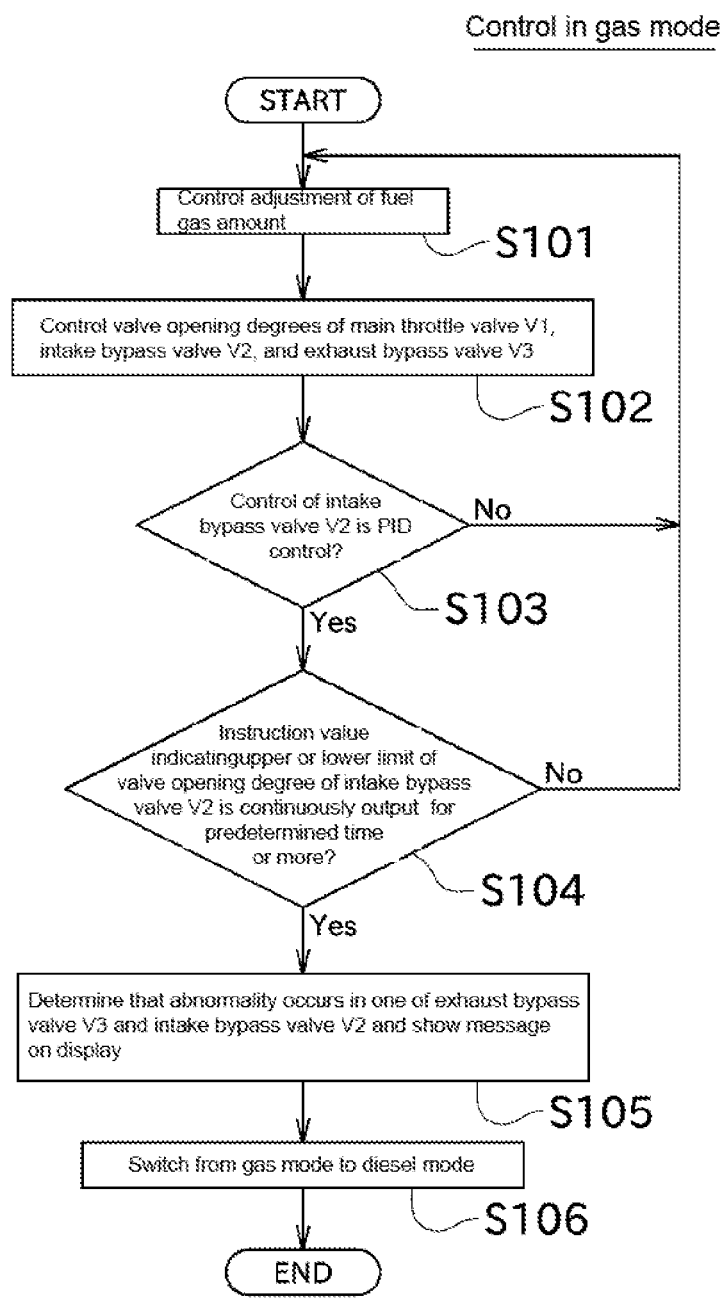
FIG. 8 A flowchart depicting a determination process performed by an engine control device in order to detect an abnormality in controlling the flow rate of a bypass channel of the turbocharger.

Next, specific control for detecting an abnormality in the intake bypass valve V2 and the exhaust bypass valve V3 will be described in detail with reference mainly to FIG. 8. FIG. 8 is a flowchart depicting a determination process performed by the engine control device 73 in order to detect an abnormality in controlling the flow rate of a bypass channel of the turbocharger 49.

As illustrated in FIG. 8, in the engine 21 driven in the gas mode, the engine control device 73 performs control of adjusting the amount of fuel gas injected by the gas injectors 98 such that the engine speed detected by the engine speed sensor 65 approaches a target value (speed adjustment control, step S101).

Then, the engine control device 73 controls the opening degrees of the main throttle valve V1, the intake bypass valve V2, and the exhaust bypass valve V3 in accordance with the engine load detected by the torque sensor 64 (step S102). As a method of control, one of the control of fixing in a fully open state, the control of fixing in a fully closed state, the map control, and the PID control (feedback control) is selected depending on the level of the engine load, as described with reference to FIG. 7.

Thereafter, the engine control device 73 determines whether the control of the valve opening degree of the intake bypass valve V2 performed in step S102 was PID control (feedback control) that causes the pressure of the intake manifold 67 to approach the target pressure or not (step S103).

In step S103, if it is determined that the control of the valve opening degree of the intake bypass valve V2 was not the PID control, the process returns to step S101, and the process is repeated.

In step S103, if it is determined that the control of the valve opening degree of the intake bypass valve V2 was the PID control, the engine control device 73 determines whether an instruction value indicating an upper or lower limit of the valve opening degree of the setting the intake bypass valve V2 (instruction for setting the setting the intake bypass valve V2 in a fully open state or a fully closed state) is continuously output for a predetermined time or more (step S104).

In step S104, if it is determined that output of the instruction value indicating the upper or lower limit of the valve opening degree of the intake bypass valve V2 is continuously suspended for the predetermined time or more, the process returns to step S101, and the process is repeated.

In step S104, if it is determined that the instruction value indicating the upper or lower limit of the valve opening degree is continuously output to the intake bypass valve V2 for the predetermined time or more, the engine control device 73 determines that a failure occurs in at least one of the exhaust bypass valve V3 and the intake bypass valve V2, and causes the display 72 of the engine-side operation control device 71 to display this failure (step S105). Accordingly, an operator of the engine 21 is notified of occurrence of an abnormality in airflow rate control early, and can take appropriate measures.

Subsequently, the engine control device 73 switches the combustion mode to the diesel mode (step S106), and the process in the gas mode is finished. In this manner, when an abnormality in airflow rate control is detected, the gas mode is switched to the diesel mode so that operation continuity required for a large-size engine for a ship can be thereby obtained.

As described above, the engine 21 according to this embodiment includes the intake manifold 67, the exhaust manifold 44, the turbocharger 49, the exhaust bypass valve V3, the intake bypass valve V2, the intake pressure sensor 39, and the engine control device 73. The intake manifold 67 supplies air into the cylinders. The exhaust manifold 44 emits exhaust gas from the cylinders. The turbocharger 49 compresses air by using the exhaust gas from the exhaust manifold 44. The exhaust bypass valve V3 is disposed in the exhaust bypass channel 18 connecting the outlet of the exhaust manifold 44 and the exhaust outlet of the turbocharger 49. The intake bypass valve V2 is disposed in the intake bypass channel 17 connecting the inlet of the intake manifold 67 and the inlet of the turbocharger 49. The intake pressure sensor 39 detects the pressure of the intake manifold 67. The engine control device 73 outputs an instruction value of the valve opening degree to the intake bypass valve V2 and performs feedback control such that the pressure detected by the intake pressure sensor 39 approaches the set target pressure of the intake manifold 67. If the instruction value indicating the upper or lower limit of the valve opening degree is continuously output for the predetermined time or more to the intake bypass valve V2 as a target of the feedback control, the engine control device 73 determines that an abnormality occurs in one of the exhaust bypass valve V3 and the intake bypass valve V2.

Accordingly, the presence of a valve (the exhaust bypass valve V3 or the intake bypass valve V2) that can be neither opened nor closed can be detected irrespective of whether this valve is open or closed. Consequently, an operator can be urged early to cope with an abnormality in airflow rate control.

The engine 21 according to this embodiment includes the gas injectors 98 and the main fuel injection valve 79. The gas injectors 98 inject gaseous fuel to air supplied from the intake manifold 67 and mix the injected gaseous fuel with the air. The main fuel injection valve 79 injects liquid fuel into the cylinders. The engine 21 can be driven by switching between the gas mode (premixed combustion mode) in which gaseous fuel injected from the gas injectors 98 is mixed with air and then the mixture is caused to flow into the combustion chambers 110 of the cylinders and the diesel mode (diffusion combustion mode) in which the main fuel injection valve 79 injects liquid fuel to thereby cause combustion in the combustion chambers 110. If it is determined that an abnormality occurs in any one of the exhaust bypass valve V3 and the intake bypass valve V2 during driving in the gas mode, the engine control device 73 switches from the gas mode to the diesel mode.

Accordingly, it is possible to prevent driving of the engine 21 in the gas mode in a state where a failure occurs in at least one of the exhaust bypass valve V3 and the intake bypass valve V2. As a result, continuity of driving of the engine 21 can be maintained.

The foregoing description is directed to the preferred embodiment of the present invention, and the configuration described above may be changed, for example, as follows.

In the description described above, the exhaust bypass valve V3 is subjected to map control. and the intake bypass valve V2 is subjected to feedback control. Alternatively, the intake bypass valve V2 may be subjected to map control with the exhaust bypass valve V3 being subjected to feedback control. Alternatively, both the intake bypass valve V2 and the exhaust bypass valve V3 may be subjected to feedback control.

The opening degree of the exhaust bypass valve V3 or the intake bypass valve V2 is no limited to map control, and may be controlled based on a predetermined mathematical expression, for example.

In a case where the engine 21 is driven in the diesel mode, in feedback control of one of the exhaust bypass valve V3 and the intake bypass valve V2, a process similar to the process described above may be performed to detect an abnormality in airflow rate control.

Detection of an abnormality in the exhaust bypass valve V3 and the intake bypass valve V2 may be performed not only for a dual fuel engine such as the engine 21 described above but also for a diesel engine or a gas engine.

As feedback control on the valve opening degree of the intake bypass valve V2, not only PID control but also other control methods such as P control and PI control may be employed.

In the embodiment described above, ignition of premixed gas in the gas mode is performed by injecting a small amount of liquid fuel from the pilot fuel injection valves 82 (micro pilot ignition). Instead of this, ignition by a spark, for example, may be performed.

In the embodiment described above, the engine 21 is used as a driving source of a propulsive and power generating mechanism of a ship, but this is not restrictive, and the engine 21 may be used for other purposes.

REFERENCE SIGNS LIST 17 intake bypass channel
18 exhaust bypass channel
21 engine
36 cylinder
44 exhaust manifold
49 turbocharger
67 intake manifold
73 engine control device (control device)
79 main fuel injection valve (fuel injection valve)
82 pilot fuel injection valve
98 gas injector
110 combustion chamber
V2 intake bypass valve
V3 exhaust bypass valve

What is claimed is:

1. An engine comprising:
an intake manifold configured to supply air into a cylinder;
a turbocharger configured to compress air with exhaust gas from an exhaust manifold; the exhaust manifold configured to emit exhaust gas from the cylinder;
an exhaust bypass channel connecting an outlet of the exhaust manifold and an exhaust outlet of the turbocharger, the exhaust bypass channel having an exhaust bypass valve in the exhaust bypass channel;
an intake bypass channel connecting an inlet of the intake manifold and an inlet of the turbocharger, the intake bypass channel provided with an intake bypass valve, wherein the engine includes at least one of the exhaust bypass channel and the intake bypass channel; and
an intake pressure sensor configured to detect a pressure of the intake manifold, wherein the engine has a configuration such that a degree of valve opening is controlled by a map control or a predetermined mathematical formula for one of the intake bypass valve and the exhaust bypass valve, and the degree of valve opening is feedback-controlled (PID control) for the other.

2. The engine according to claim 1, further comprising:
a gas injector configured to inject gas fuel to air supplied from the intake manifold and mix the gas fuel with the air; and a fuel injection valve configured to inject liquid fuel to the cylinder,
wherein the engine is configured to be able to switch between a premixed combustion mode in which the gas fuel injected from the gas injector and mixed with air is caused to flow into a combustion chamber of the cylinder and a diffusion combustion mode in which combustion occurs by injection of the liquid fuel by the fuel injection valve into the combustion chamber, and during driving in the premixed combustion mode, if an abnormality occurs in the engine, the control device switches from the premixed combustion mode to the diffusion combustion mode.

* * * * *